US011965280B2

(12) United States Patent
Harbrecht et al.

(10) Patent No.: US 11,965,280 B2
(45) Date of Patent: Apr. 23, 2024

(54) DOOR HINGE FOR A LAUNDRY APPLIANCE HAVING A SHEET METAL HINGE AND AN INTEGRATED ROTATION LIMITING DEVICE

(71) Applicant: WHIRLPOOL CORPORATION, Benton Harbor, MI (US)

(72) Inventors: Ethan Harbrecht, Laporte, IN (US); Arunkumar Harikrishnasamy, Stevensville, MI (US); Tushar S. Jadhav, Pune (IN); Ravindra B. Salunkhe, Maharashtra (IN)

(73) Assignee: Whirlpool Corporation, Benton Harbor, MI (US)

( * ) Notice: Subject to any disclaimer, the term of this patent is extended or adjusted under 35 U.S.C. 154(b) by 202 days.

(21) Appl. No.: 17/366,344

(22) Filed: Jul. 2, 2021

(65) Prior Publication Data

US 2023/0002953 A1 Jan. 5, 2023

(51) Int. Cl.

| | |
|---|---|
| ***D06F 39/14*** | (2006.01) |
| ***E05D 3/02*** | (2006.01) |
| ***E05D 5/04*** | (2006.01) |
| ***E05D 11/06*** | (2006.01) |

(52) U.S. Cl.

CPC ............... *D06F 39/14* (2013.01); *E05D 3/02* (2013.01); *E05D 5/04* (2013.01); *E05D 11/06* (2013.01); *E05Y 2201/224* (2013.01); *E05Y 2900/312* (2013.01)

(58) Field of Classification Search

CPC .......... D06F 39/14; D06F 37/10; D06F 37/28; D06F 34/28; E05Y 2900/312; E05Y 2201/266; F25D 23/04; E05D 11/06; E05D 3/02; E05D 7/105; E05D 11/1028; E05D 11/082; E05D 5/04

See application file for complete search history.

(56) References Cited

U.S. PATENT DOCUMENTS 1,030,801 A * 6/1912 Berault ................. E05D 7/1016 16/262
1,409,663 A * 3/1922 Burns ........................ E05D 9/00 16/266
2,274,160 A * 2/1942 Porter ..................... D06F 37/28 16/251
2,929,093 A * 3/1960 Conlee .................... E05D 11/06 16/338

(Continued)

FOREIGN PATENT DOCUMENTS

WO 03056121 7/2003

*Primary Examiner* — Hiwot E Tefera
(74) *Attorney, Agent, or Firm* — Price Heneveld LLP

(57) ABSTRACT

An appliance includes an outer cabinet having a front aperture for accessing a processing space. A door selectively engages the front aperture in a closed position to enclose the processing space. A hinge includes a cabinet mount attached to the outer cabinet and having a stop that defines an open position of the door. A hinge pin extends through the cabinet mount to define a rotational axis of the hinge. A sheet metal flange is press fit onto the hinge pin and is fixedly attached to the door. The sheet metal flange is wrapped around the hinge pin and is attached to the door via fasteners. The pin includes a protrusion that selectively engages the stop of the cabinet mount in the open position.

20 Claims, 19 Drawing Sheets

(56) References Cited

U.S. PATENT DOCUMENTS 3,298,135 A * 1/1967 Kinser ........................ E05D 7/02 49/382
3,538,539 A * 11/1970 Clifford ..................... E05D 5/14 16/375
3,822,440 A * 7/1974 Stansbury, Jr. ..... E05D 11/1014 16/303
3,931,663 A * 1/1976 Holmes ............... E05D 11/1014 16/DIG. 13
4,224,715 A * 9/1980 Iseki ........................ E05D 11/00 16/388
4,573,239 A * 3/1986 Valenti ....................... E05D 5/10 16/DIG. 42
4,641,393 A * 2/1987 Lautenschlager ..... E05D 7/0407 16/370
4,819,299 A * 4/1989 Holan ................. E05D 11/1014 16/296
4,891,862 A * 1/1990 Holan ................. E05D 11/1014 16/334
5,141,124 A * 8/1992 Smith ...................... E05D 11/06 220/908
5,463,795 A * 11/1995 Carlson ................... F16C 17/10 16/385
6,173,475 B1 * 1/2001 Senn .......................... E05D 5/14 16/385
8,307,513 B1 * 11/2012 Fitzgerald ............... E05D 11/06 16/386
8,732,908 B2 * 5/2014 Hatano ................. E05D 11/082 16/342
2003/0014838 A1 * 1/2003 deOliveira ................ E05D 3/02 16/233
2005/0204510 A1 * 9/2005 Heimann .................. E05D 3/12 16/366
2012/0192380 A1 * 8/2012 Huang .................... D06F 39/14 16/319
2014/0009049 A1 1/2014 Sung et al.
2020/0362504 A1 11/2020 Li et al.
2021/0095510 A1 4/2021 Lee et al.

* cited by examiner

Method 400 for Attaching a Door to an Appliance Cabinet

DOOR HINGE FOR A LAUNDRY APPLIANCE HAVING A SHEET METAL HINGE AND AN INTEGRATED ROTATION LIMITING DEVICE

BACKGROUND OF THE DISCLOSURE

The present disclosure generally relates to laundry appliances, and more specifically, a hinge for attaching a rotationally operable door to a structural cabinet for an appliance, where the door includes a sheet metal hinge and an integral feature for limiting rotational operation of the door toward an open position.

SUMMARY OF THE DISCLOSURE

According to one aspect of the present disclosure, an appliance includes an outer cabinet having a front aperture for accessing a processing space. A door selectively engages the front aperture in a closed position to enclose the processing space. A hinge includes a cabinet mount attached to the outer cabinet and having a stop that defines an open position of the door. A hinge pin extends through the cabinet mount to define a rotational axis of the hinge. A sheet metal flange is press fit onto the hinge pin and is fixedly attached to the door. The sheet metal flange is wrapped around the hinge pin and is attached to the door via fasteners. The pin includes a protrusion that selectively engages the stop of the cabinet mount in the open position.

According to another aspect of the present disclosure, a method for attaching a door to an appliance cabinet includes steps of placing a bushing within a bracket portion of a cabinet mount for a hinge, and inserting a hinge pin within a central bore of the bushing. Opposing ends of the hinge pin extend outward from the bracket portion and the bushing. A cam portion of the hinge pin is located to abut a stop to define an open position of the hinge. The stop is located within the central bore of the bushing. Attachment members of a sheet metal flange are located on the opposing ends of the hinge pin. The attachment members are press fit around the opposing ends of the hinge pin to fixedly secure the sheet metal flange to the hinge pin and fixedly secure the busing to the cabinet mount.

According to yet another aspect of the present disclosure, a method for attaching a door to an appliance cabinet includes placing a bushing within a bracket portion of a cabinet mount for a hinge. A hinge pin is inserted within a central bore of the bushing. Opposing ends of the hinge pin extend outward from the bracket portion and the bushing. The hinge pin includes a cam member. An abutment portion of the cam member selectively engages a stop of the bracket portion in an open position of the hinge. Attachment members of a sheet metal flange are located on the opposing ends of the hinge pin. The cam member is located between the bracket portion and one of the attachment members. The attachment members are press fit onto the opposing ends of the hinge pin to fixedly secure the sheet metal flange to the hinge pin and fixedly secure the bushing to the cabinet mount.

These and other features, advantages, and objects of the present disclosure will be further understood and appreciated by those skilled in the art by reference to the following specification, claims, and appended drawings.

Figure 2:
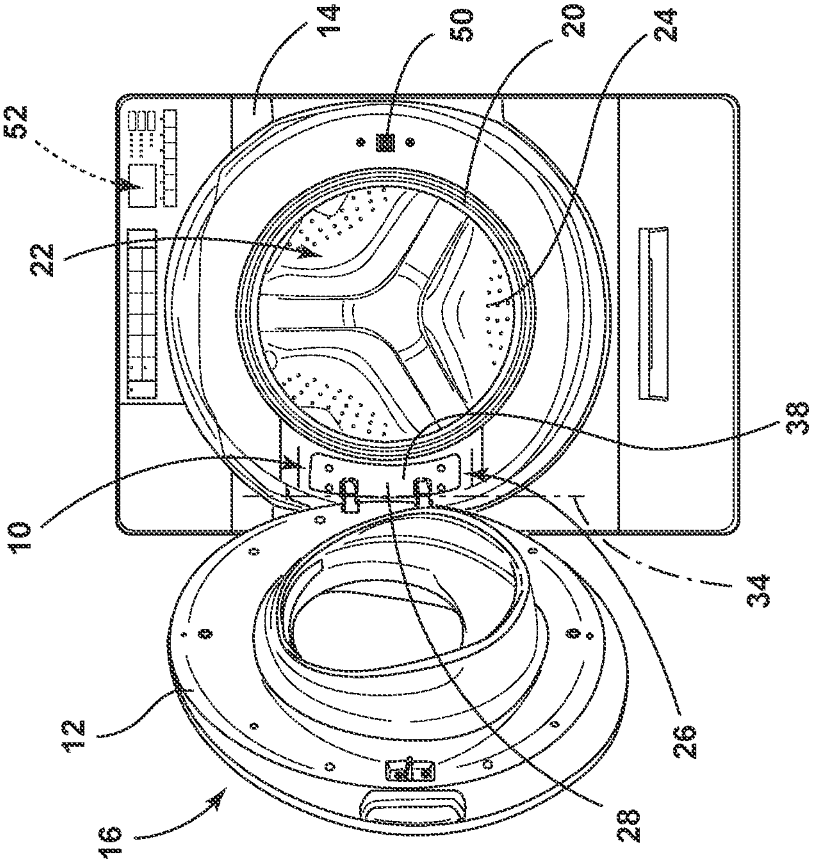
FIG. 2 is a front elevational view of the laundry appliance of FIG. 1 and showing the door in an open position.

The components in the figures are not necessarily to scale, emphasis instead being placed upon illustrating the principles described herein.

DETAILED DESCRIPTION

The present illustrated embodiments reside primarily in combinations of method steps and apparatus components related to a hinge for a door of a laundry appliance having a sheet metal portion and an integral stop mechanism. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
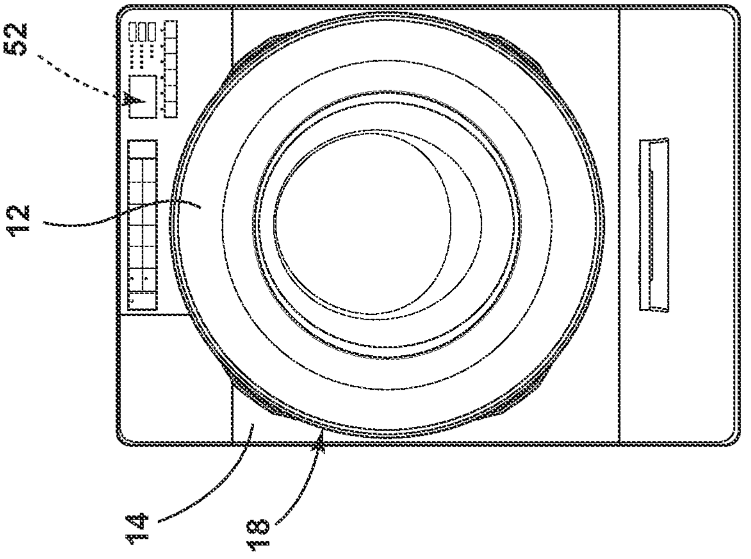
FIG. 1 is a front elevational view of a laundry appliance incorporating an aspect of the sheet metal hinge, and showing the door in a closed position.
Figure 3:
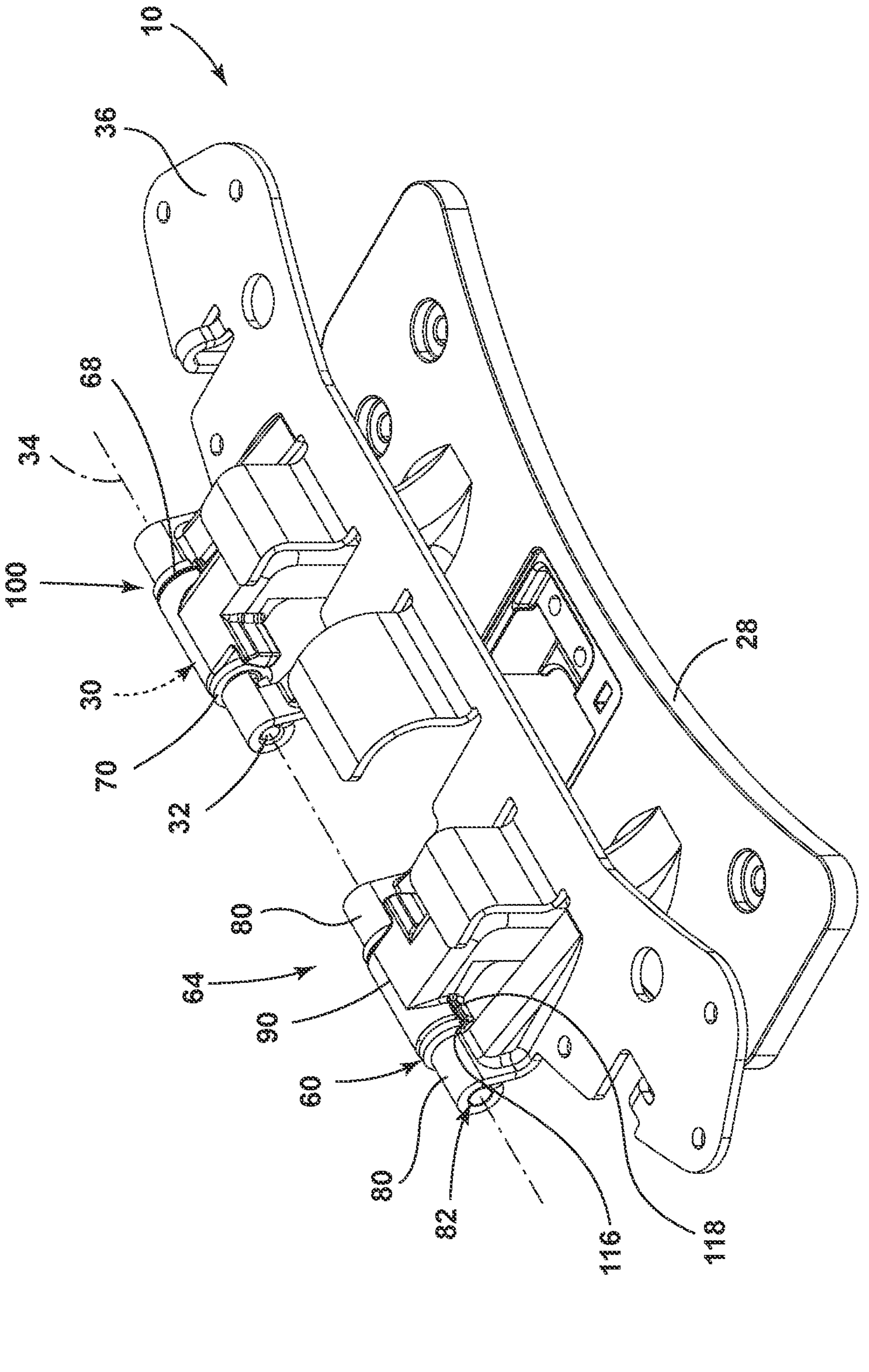
FIG. 3 is a top perspective view of an aspect of the sheet metal hinge.
Figure 4:
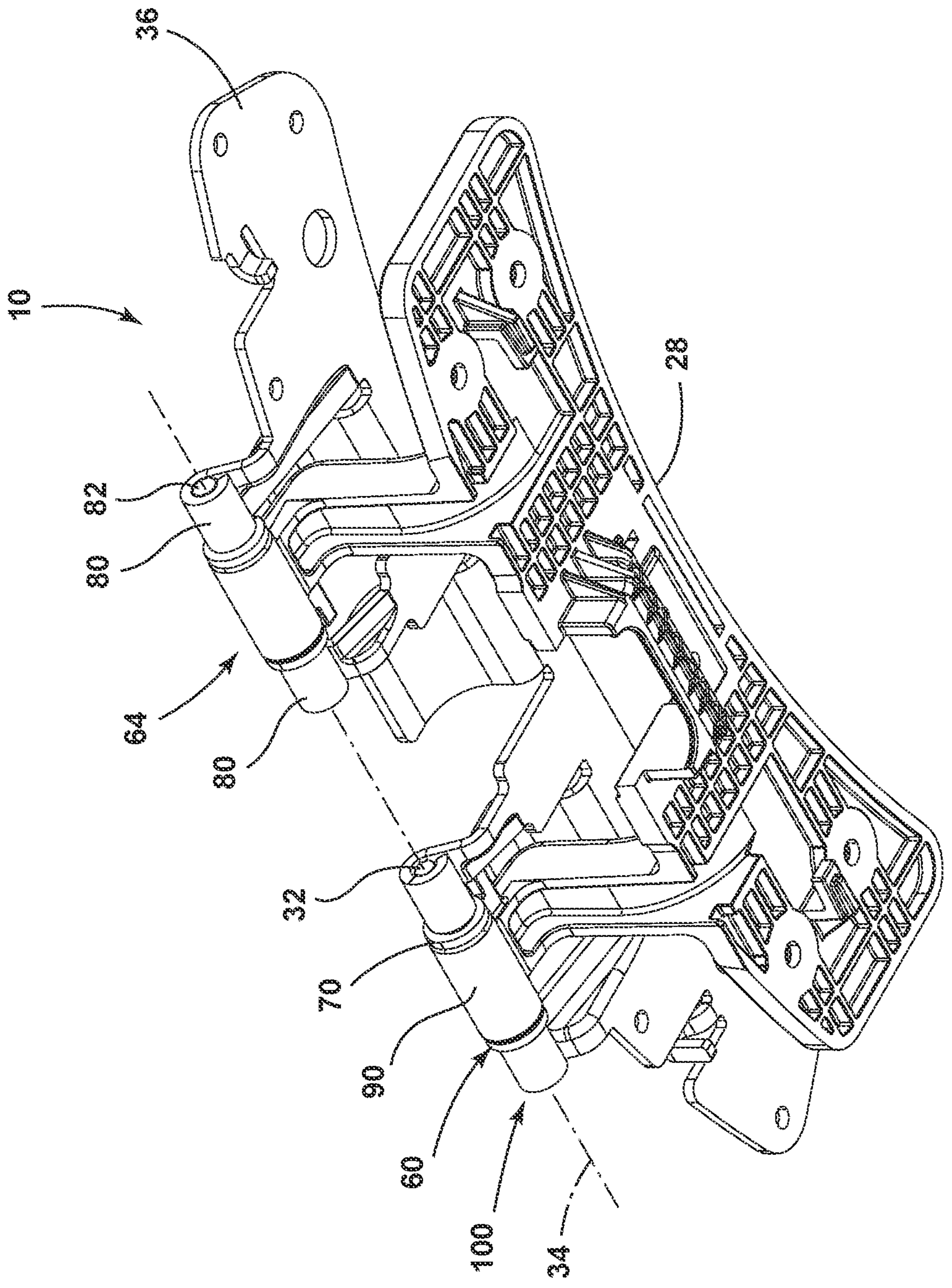
FIG. 4 is a bottom perspective view of the sheet metal hinge of FIG. 3.
Figure 5:
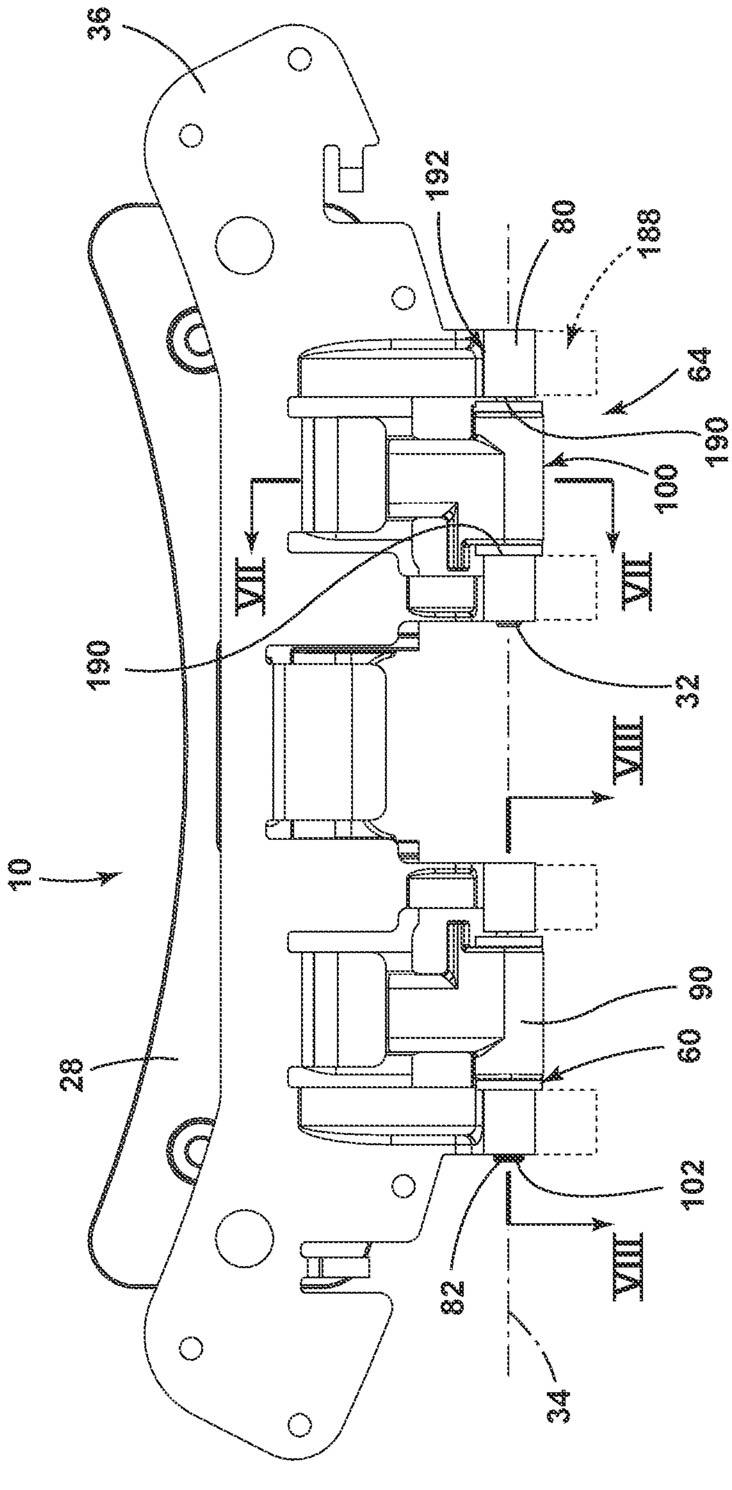
FIG. 5 is a side elevational view of the sheet metal hinge of FIG. 3.
Figure 6:
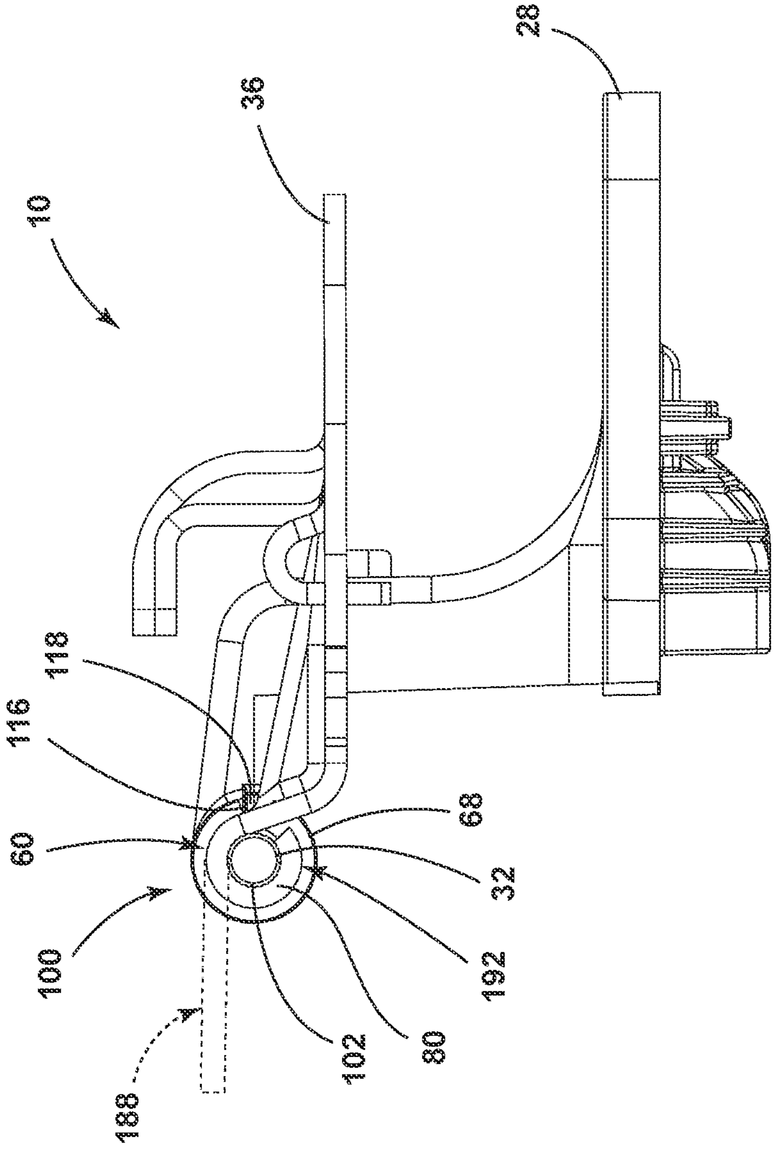
FIG. 6 is an end elevational view of the sheet metal hinge of FIG. 3.
Figure 7:
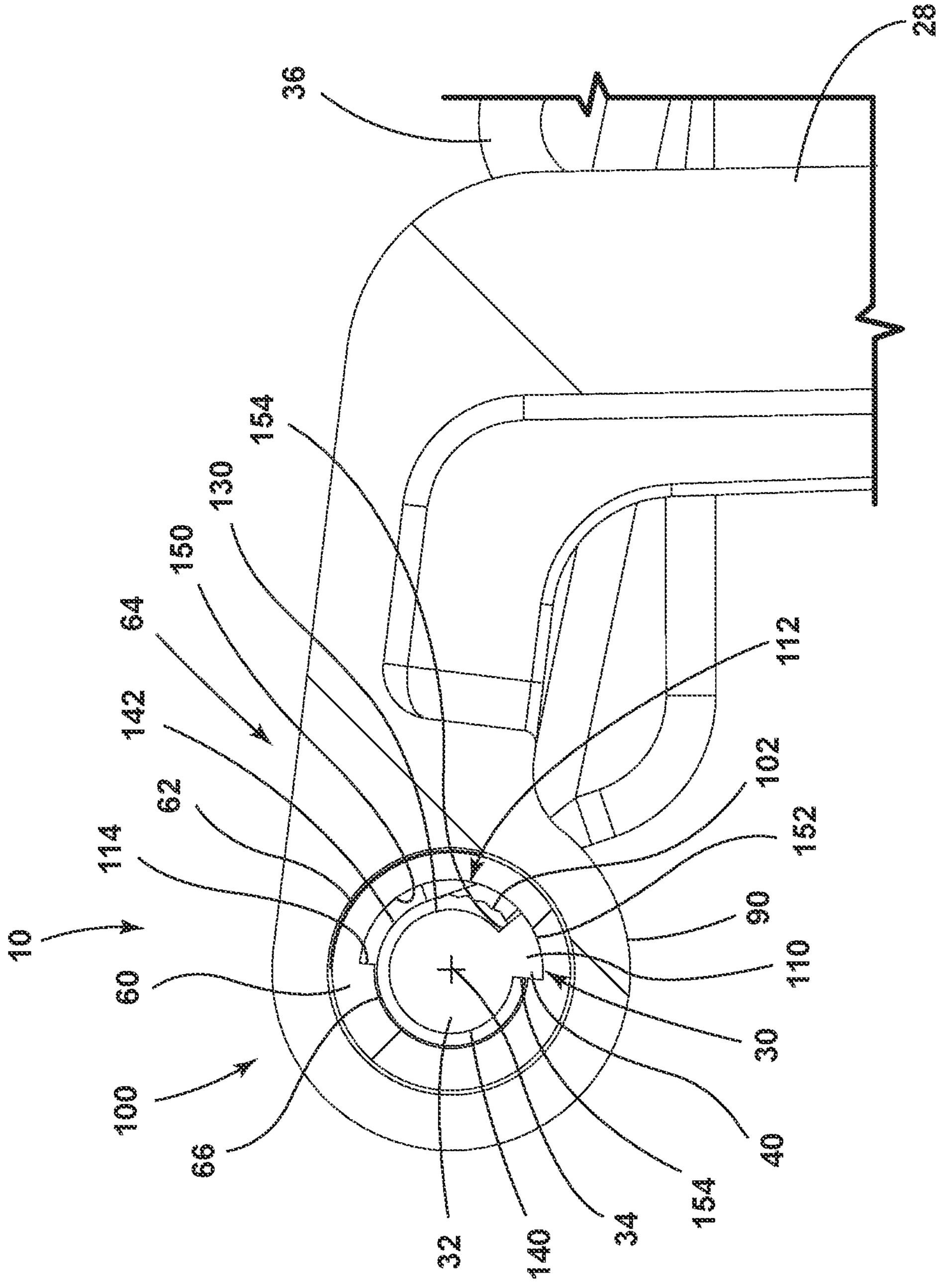
FIG. 7 is a cross-sectional view of the sheet metal hinge of FIG. 5 taken along line VII-VII.
Figure 8:
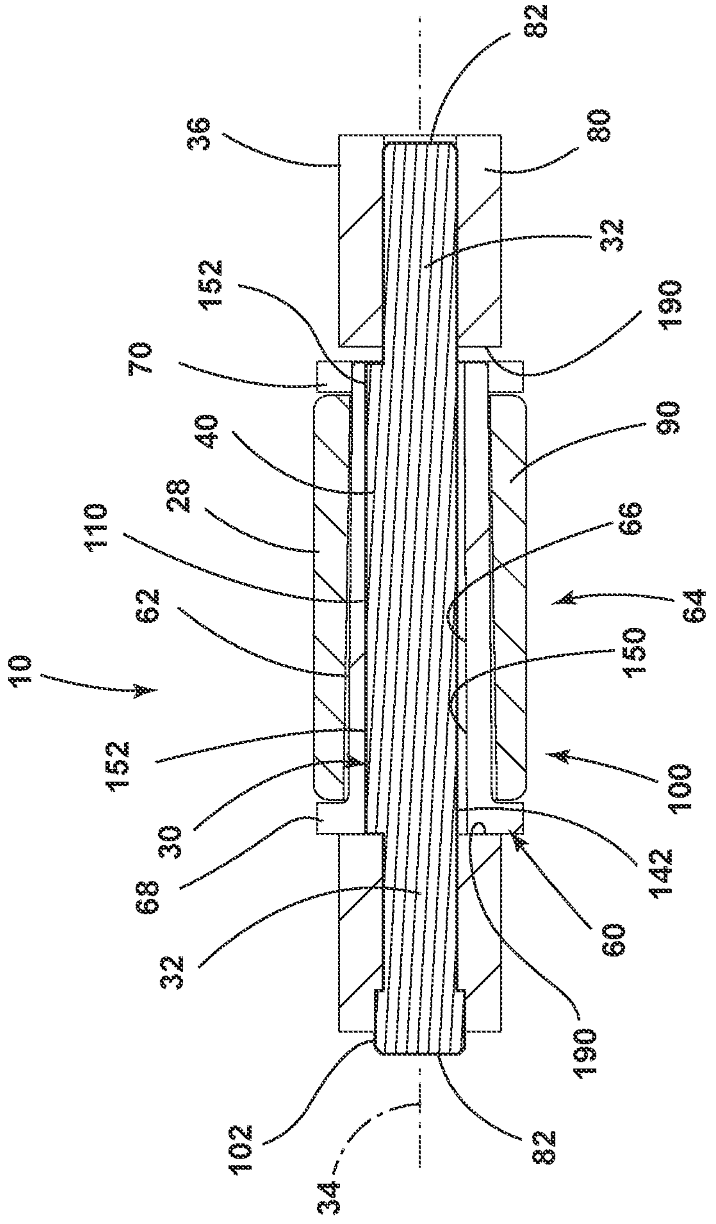
FIG. 8 is a cross-sectional view of the sheet metal hinge of FIG. 5 taken along line VIII-VIII.
Figure 9:
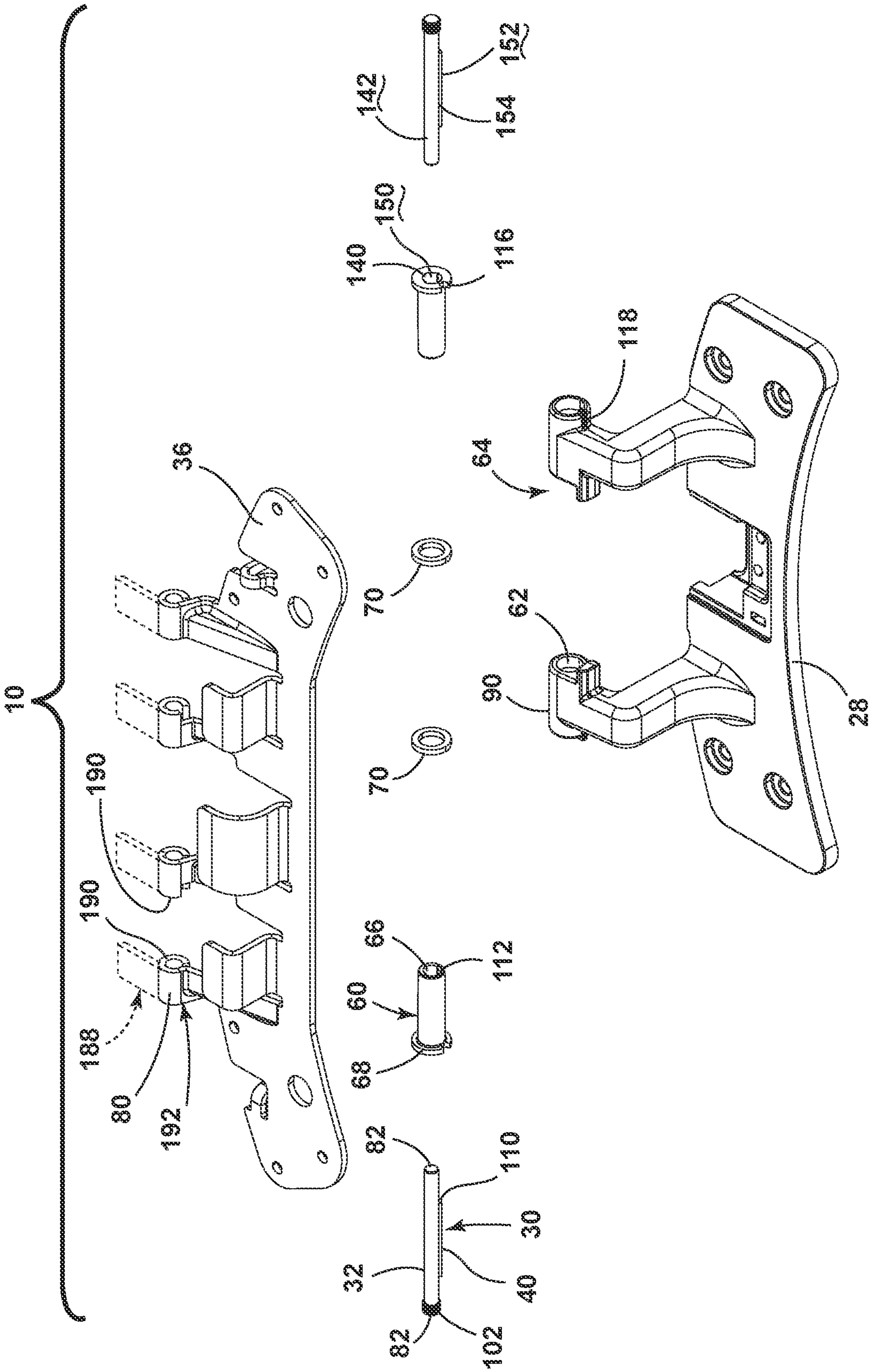
FIG. 9 is an exploded perspective view of the sheet metal hinge of FIG. 3.
Figure 12:
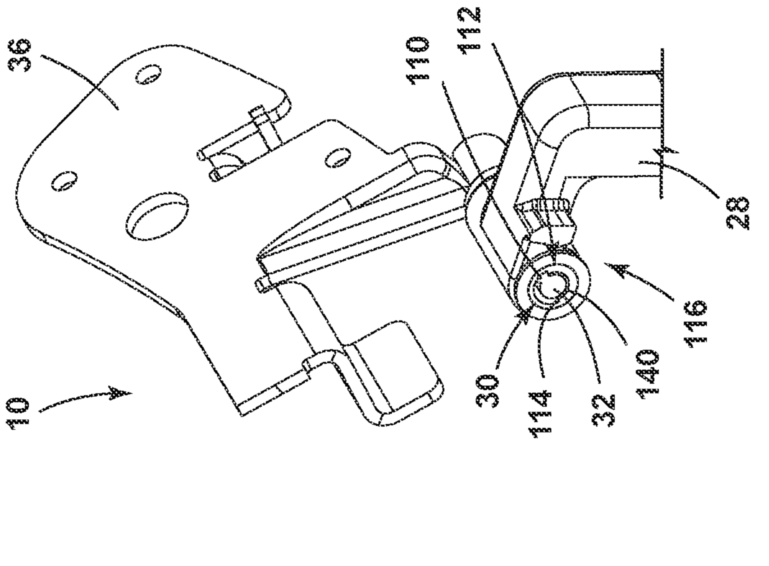
FIG. 12 is an enlarged cross-sectional perspective view of the sheet metal hinge of FIG. 11, shown in an open position.
Figure 11:
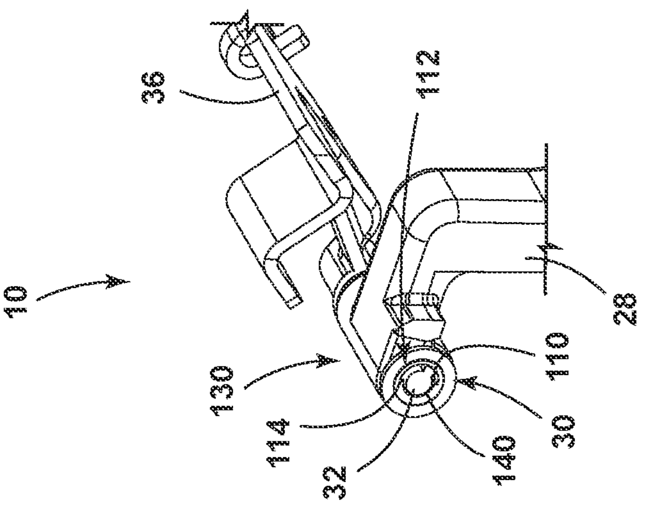
FIG. 11 is an enlarged cross-sectional perspective view of the sheet metal hinge of FIG. 10, shown in an intermediate rotational position.
Figure 10:
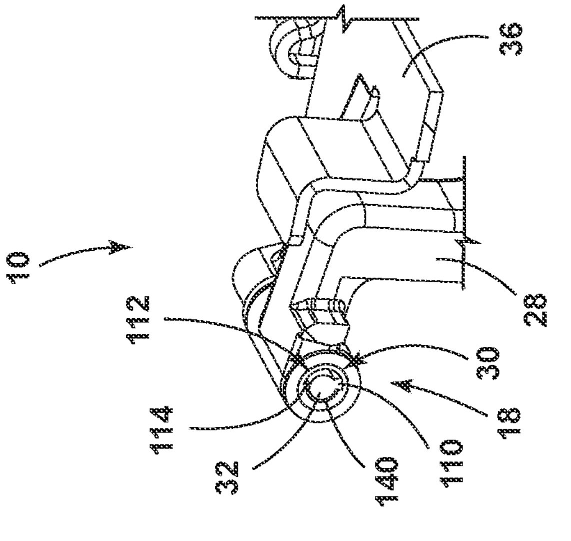
FIG. 10 is an enlarged cross-sectional perspective view of the sheet metal hinge of FIG. 7, shown in a closed position.
Figure 13:
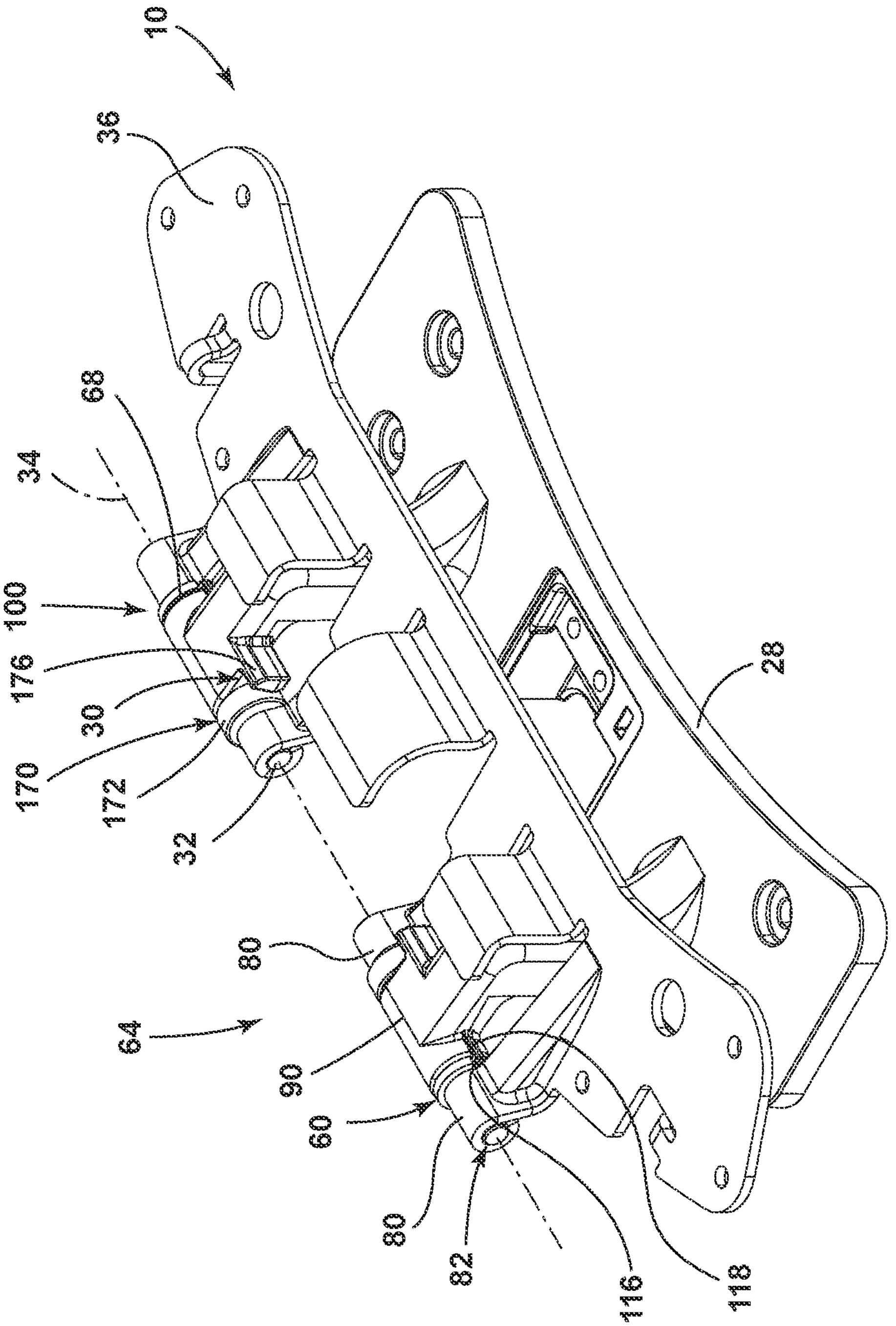
FIG. 13 is a top perspective view of an aspect of the sheet metal hinge.
Figure 14:
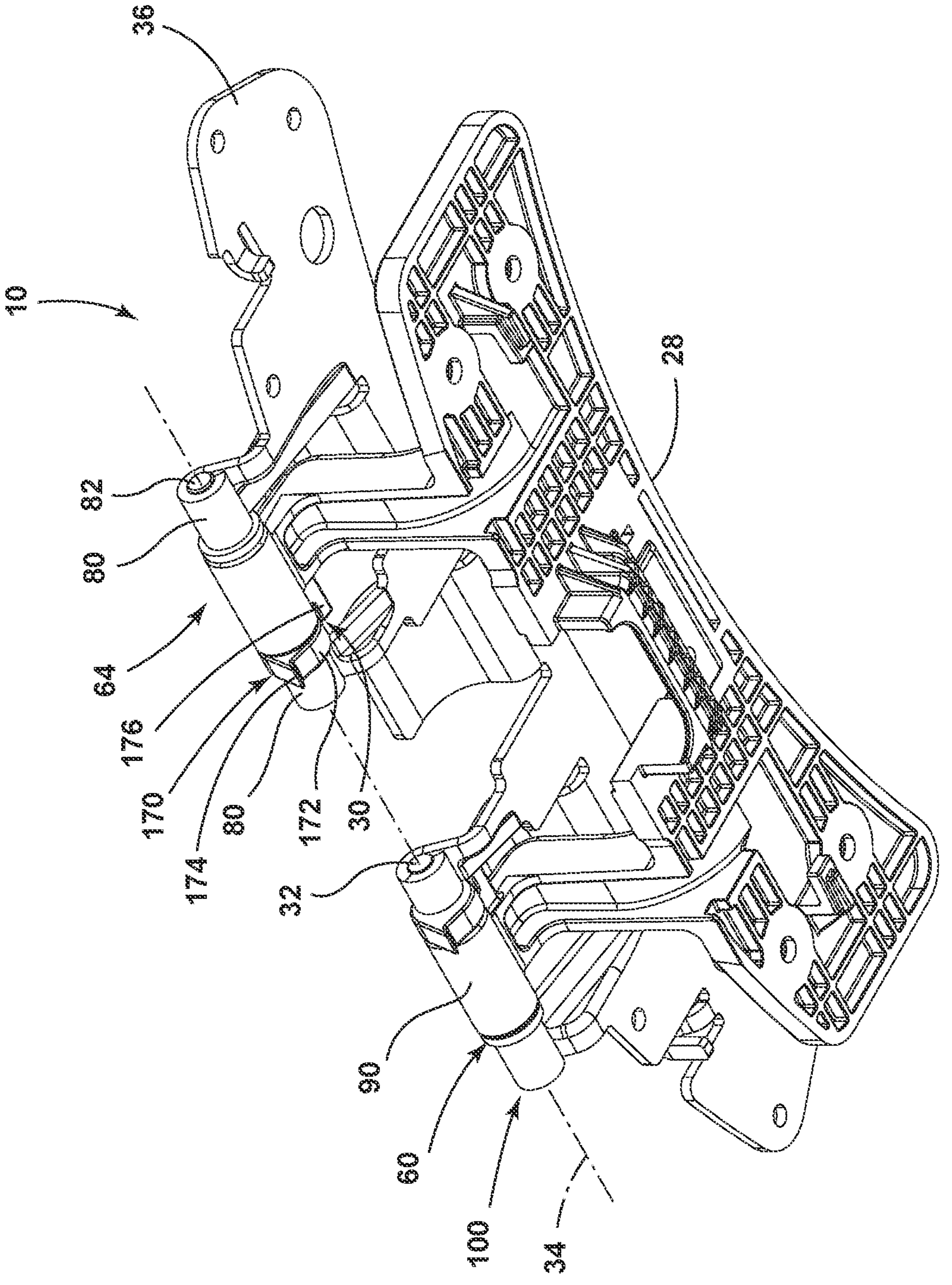
FIG. 14 is a bottom perspective view of the sheet metal hinge of FIG. 13.
Figure 15:
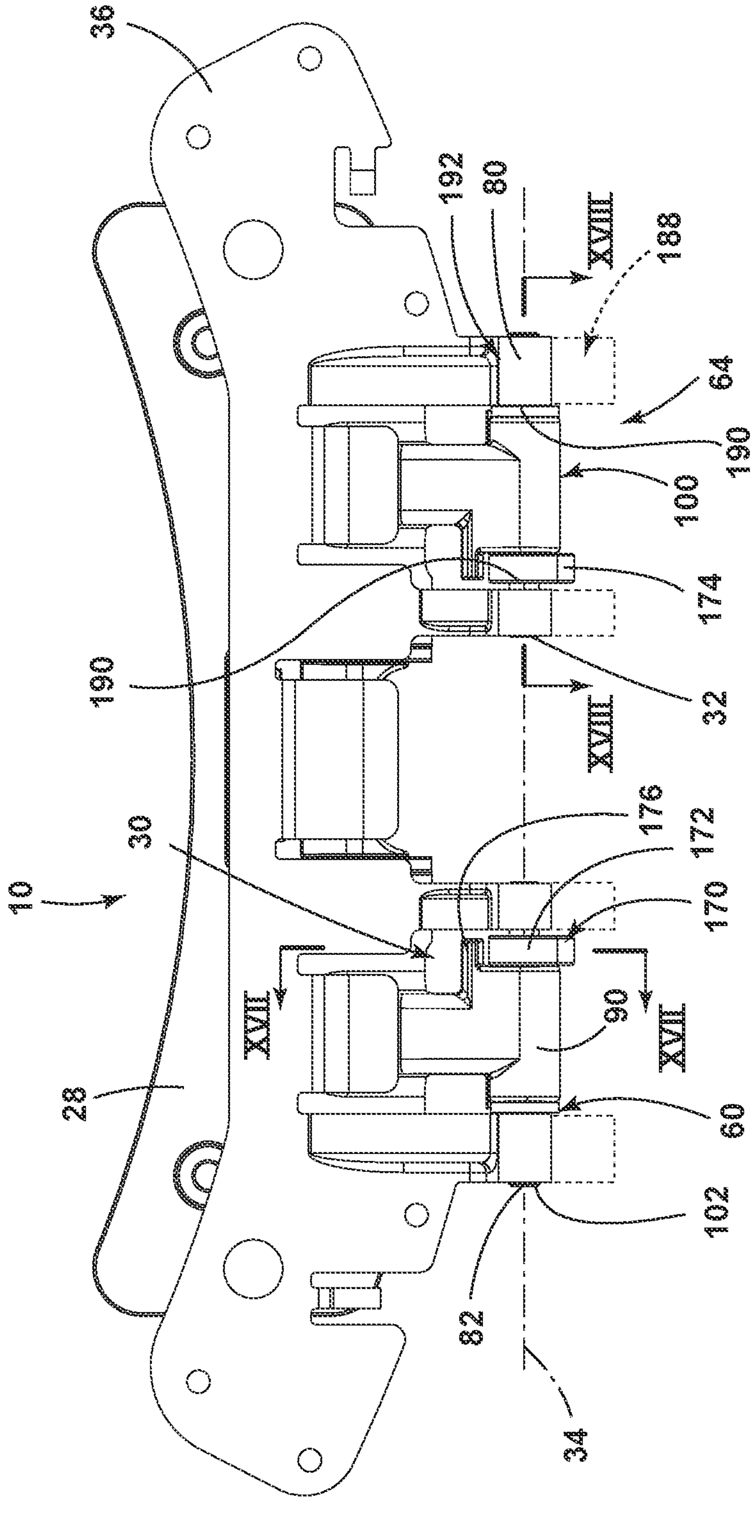
FIG. 15 is a side elevational view of the sheet metal hinge of FIG. 13.
Figure 16:
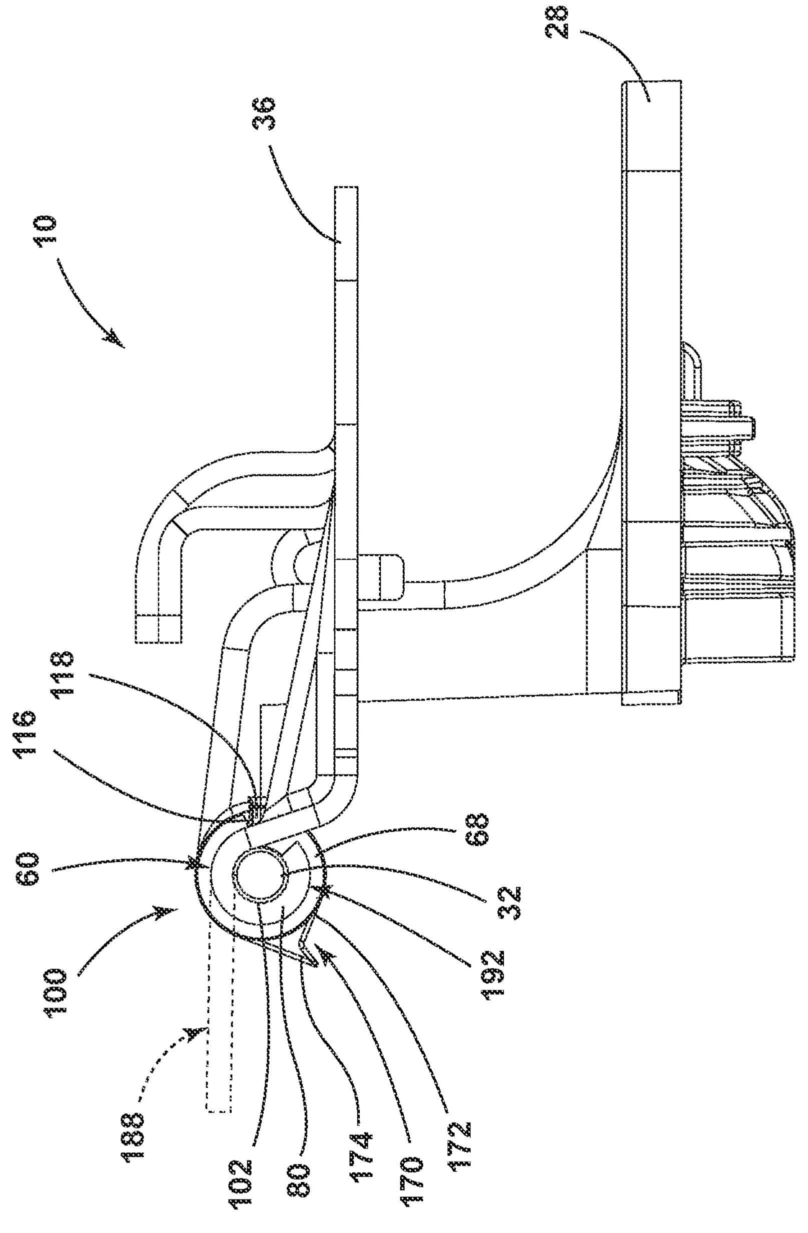
FIG. 16 is an end elevational view of the sheet metal hinge of FIG. 13.
Figure 17:
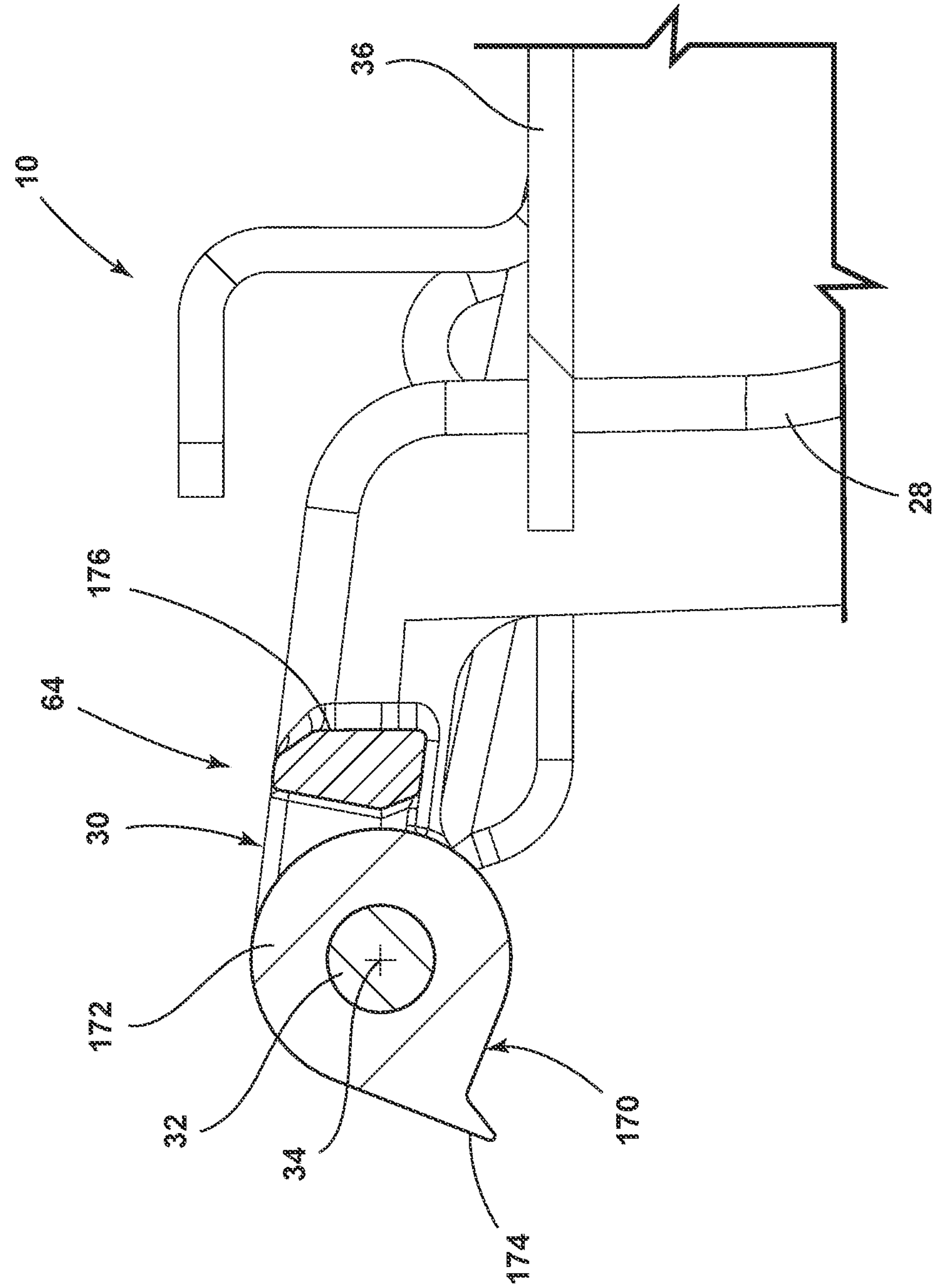
FIG. 17 is a cross-sectional view of the sheet metal hinge of FIG. 15 taken along line XVII-XVII.
Figure 18:
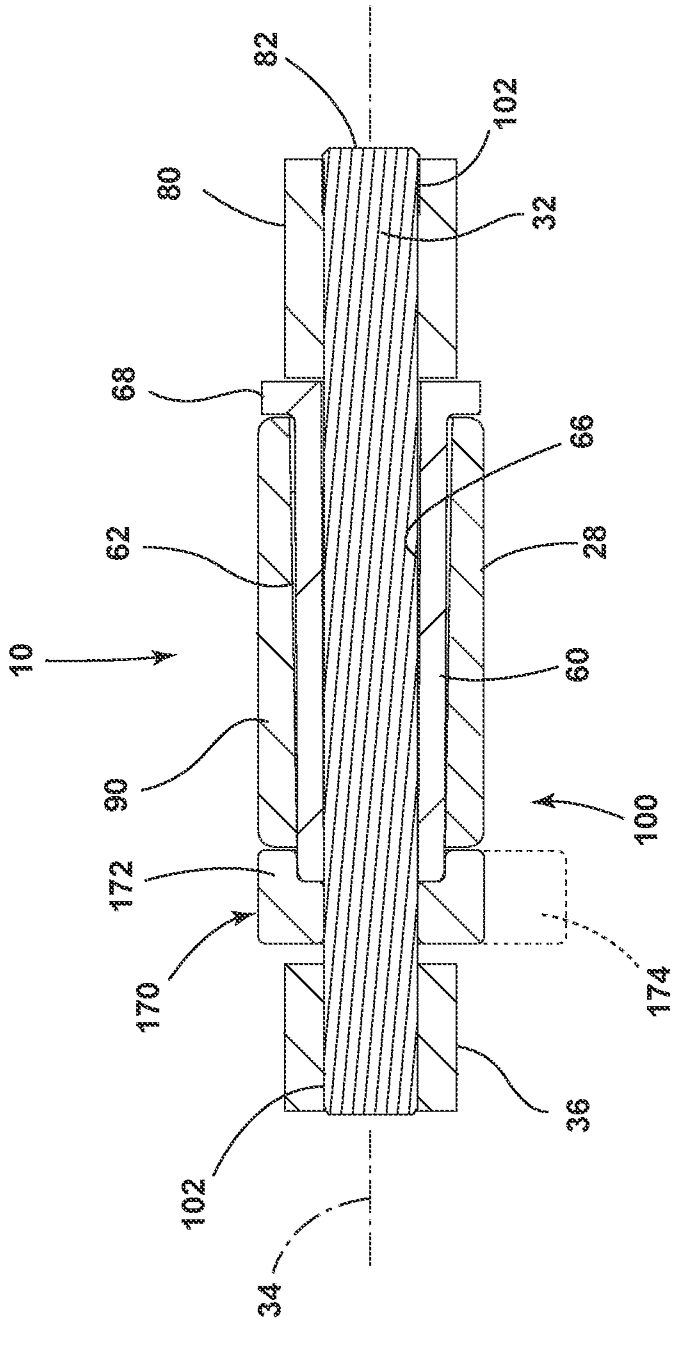
FIG. 18 is a cross-sectional view of the sheet metal hinge of FIG. 15 taken along line XVIII-XVIII.
Figure 19:
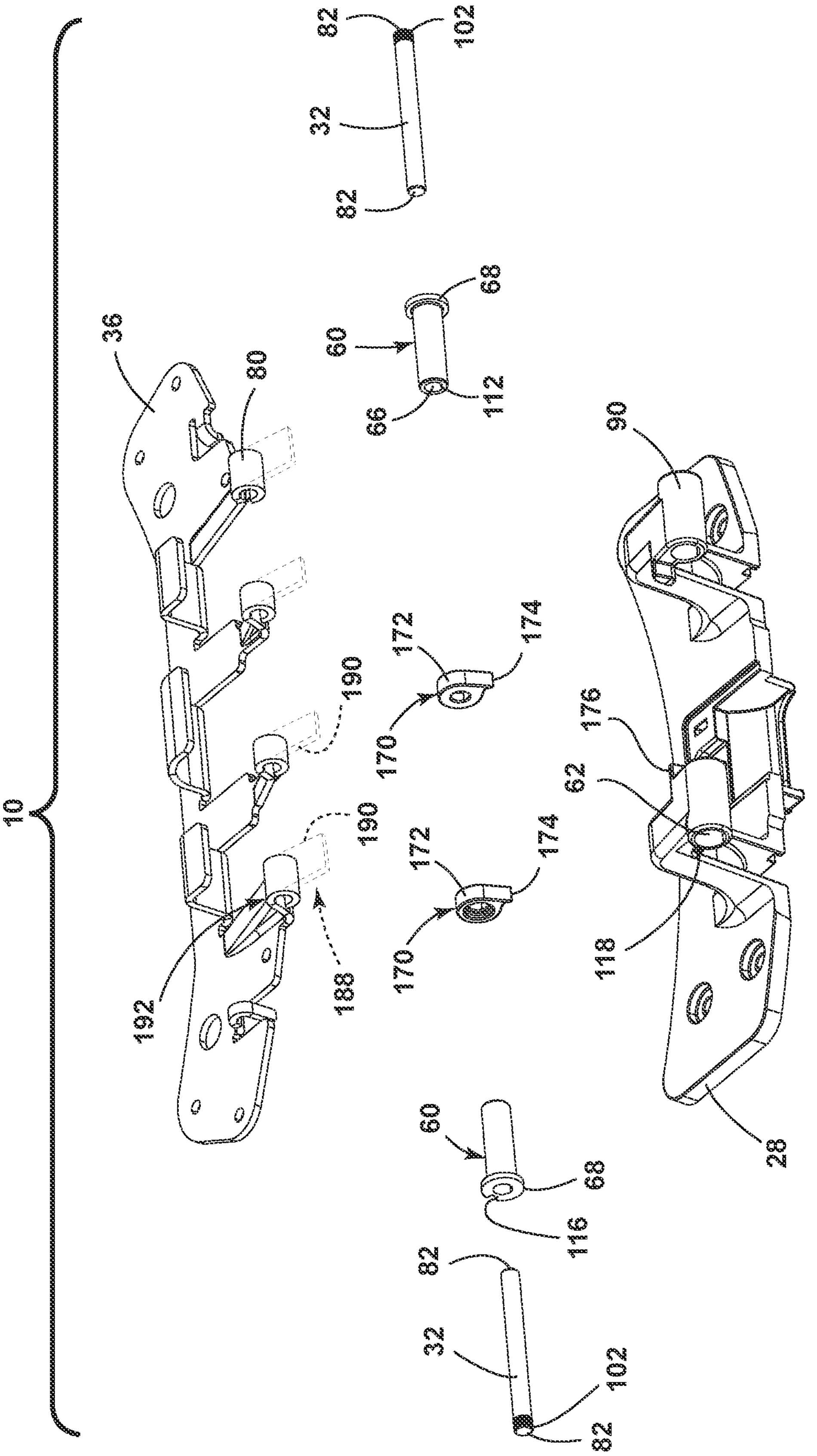
FIG. 19 is an exploded perspective view of the sheet metal hinge of FIG. 13.
Figure 20:
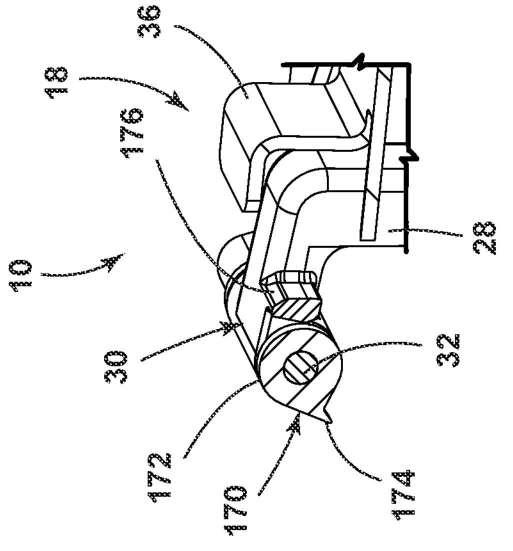
FIG. 20 is an enlarged cross-sectional perspective view of the sheet metal hinge of FIG. 17, shown in a closed position.
Figure 21:
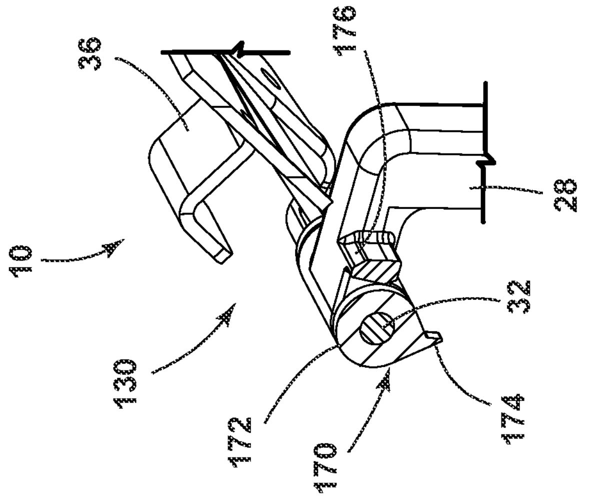
FIG. 21 is an enlarged cross-sectional perspective view of the sheet metal hinge of FIG. 20, shown in an intermediate rotational position.
Figure 22:
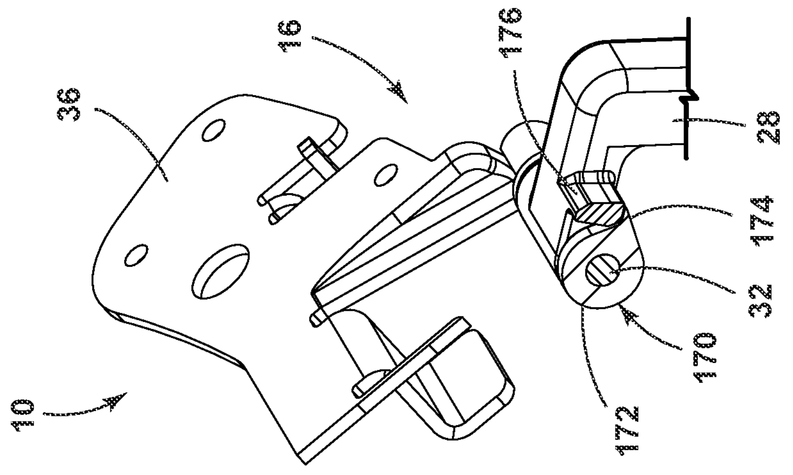
FIG. 22 is an enlarged cross-sectional perspective view of the sheet metal hinge of FIG. 21, shown in an open position.
Figure 23:
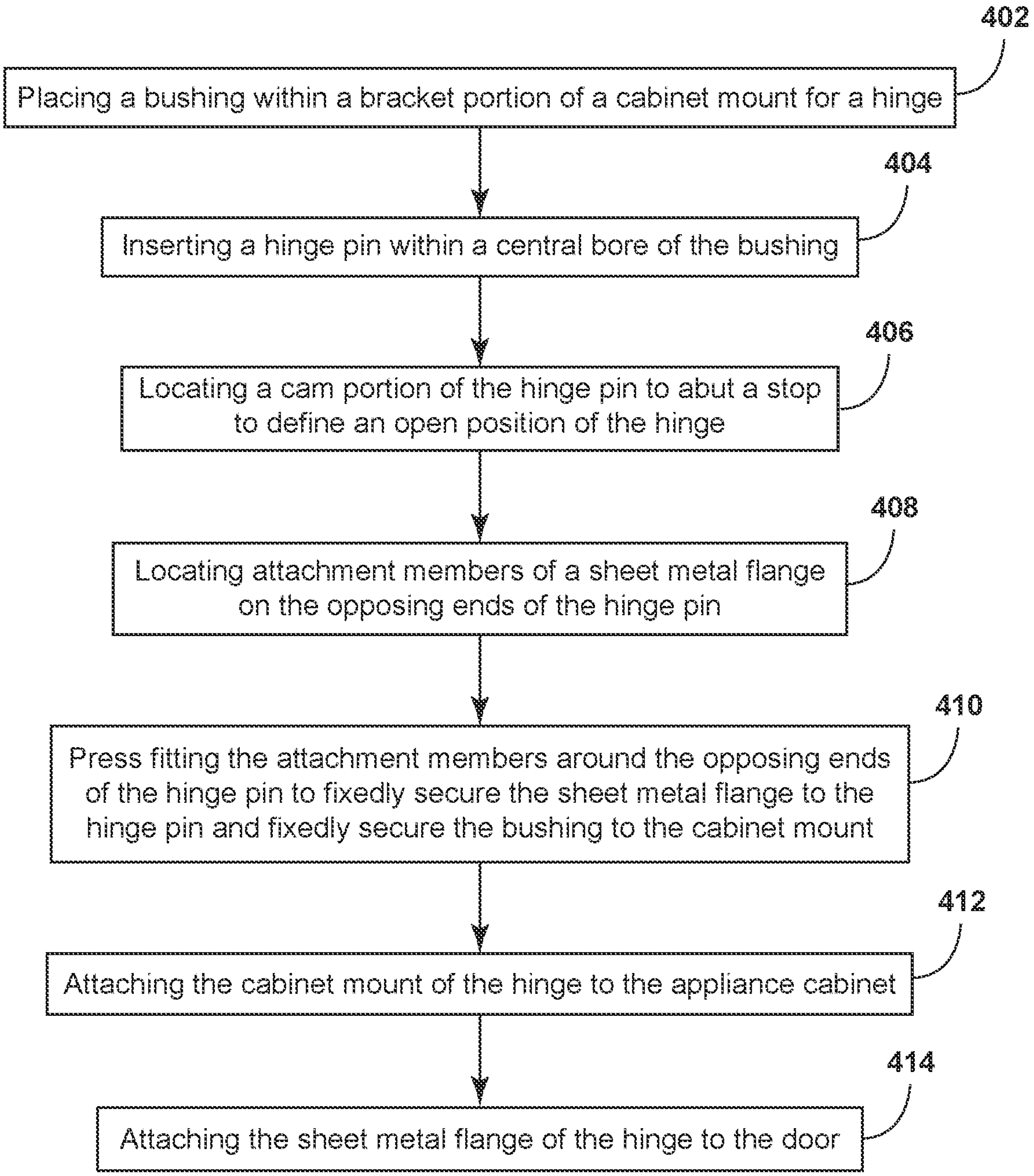
FIG. 23 is a linear flow diagram illustrating a method for attaching a door to an appliance cabinet.
Figure 24:
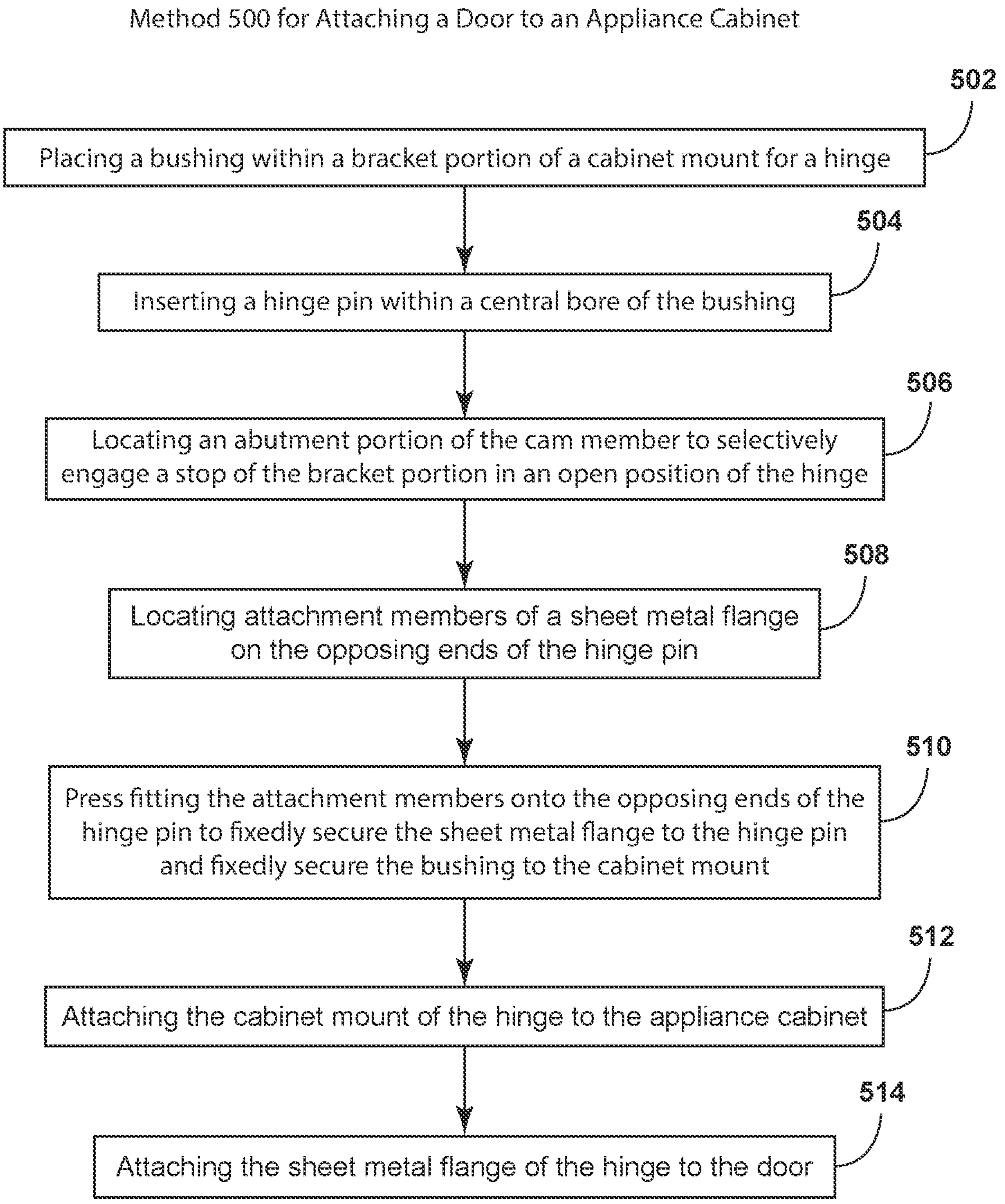
FIG. 24 is a linear flow diagram illustrating a method for attaching a door to an appliance cabinet.

For purposes of description herein, the terms “upper,” “lower,” “right,” “left,” “rear,” “front,” “vertical,” “horizontal,” and derivatives thereof shall relate to the disclosure as oriented in FIG. 1. Unless stated otherwise, the term “front” shall refer to the surface of the element closer to an intended viewer, and the term “rear” shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms “including,” “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “comprises a . . . ” does not, without more constraints, preclude the existence of additional identical elements in the process, method, article, or apparatus that comprises the element.

Referring to FIGS. 1-22, reference numeral 10 generally refers to a sheet metal hinge that is used for attaching a door 12 to an appliance cabinet 14 and providing for rotational motion of the door 12 with respect to the appliance cabinet 14 between open and closed positions 16, 18 of the door 12. According to various aspects of the device, an appliance includes an outer cabinet 14 having a front aperture 20 for accessing a processing space 22. The processing space 22 is typically within a rotating drum 24, through which a processing media moves fluidly therethrough. The processing media can be a liquid media, a gaseous media, or a combination thereof. The door 12 is attached to the outer cabinet 14 and selectively engages the front aperture 20 in a closed position 18 of the door 12 to enclose the processing space 22. A hinge 26, also referred to herein as the sheet metal hinge 10, includes a cabinet mount 28 that is attached to the cabinet 14 and includes a stop 30 that defines the open position 16 of the door 12. A hinge pin 32 extends through the cabinet mount 28 to define a rotational axis 34 of the sheet metal hinge 10. A sheet metal flange 36 is press fit onto the hinge pin 32 and is fixedly attached to the door 12. The sheet metal flange 36 is wrapped around the hinge pin 32, typically via press fitting, and is attached to the door 12 via fasteners 38. The hinge pin 32 includes a protrusion 40 that selectively engages the stop 30 of the cabinet mount 28 when the door 12 is in the open position 16.

When the door 12 is in the closed position 18, various locking mechanisms 50 can be used to secure the door 12 in the closed position 18 with respect to the cabinet 14 for enclosing the processing space 22. This allows for the articles being processed and the processing media to be contained within the processing space 22. One or more controllers 52 can be used for operating this locking mechanism 50 and allowing the door 12 to be moved from the closed position 18 to the open position 16. In the open position 16, the hinge pin 32, which is attached to the sheet metal flange 36, rotates about the rotational axis 34 relative to the cabinet mount 28. As will be described more fully below, portions of the hinge pin 32 engage integral features incorporated within the cabinet mount 28 that form the stop 30 to define the open position 16 of the door 12 and prevent over rotation of the door 12 beyond the open position 16. In addition, use of the integral stop 30 that is incorporated within the hinge pin 32 and the cabinet mount 28 minimizes eccentric rotational forces that are exerted on the hinge 26 when the door 12 is moved to the open position 16.

To assist in confining moment forces to the engagement between the hinge pin 32 and the integral stop 30 included within the cabinet mount 28, the cabinet mount 28 includes a bushing 60 that is secured within a borehole 62 of the bracket portion 64 of the cabinet mount 28. The hinge pin 32 extends through a central bore 66 of the bushing 60 and is rotationally operable within the bushing 60 between the open and closed positions 16, 18. The bushing 60 is secured to the cabinet mount 28. In this manner, the sheet metal flange 36 and the hinge pin 32 rotate as a unit and the bushing 60 and the cabinet mount 28 are fixed to one another and remain stationary during operation of the door 12 between the open and closed positions 16, 18. To assist in the rotational operation of the door 12, the bushing 60 includes an end flange 68 that is positioned at one side of the bracket portion 64. A washer 70 is positioned at an opposing side of the bracket portion 64. As will be more fully described below, this washer 70 can take various forms, and in certain aspects of the device, can be incorporated within a portion of the integral stop 30 of the sheet metal hinge 10.

Referring again to FIGS. 3-22, the sheet metal flange 36 is attached to the hinge pin 32 after the hinge pin 32 and the bushing 60 are connected to the bracket portion 64 of the cabinet mount 28. When in this position, attachment members 80 of the sheet metal flange 36 are configured to be press fit onto opposing ends 82 of the hinge pin 32 when the hinge pin 32 is positioned within the bushing 60 and the bracket portion 64 of the cabinet mount 28. Through this configuration, the press fit operation that secures the attachment members 80 of the sheet metal flange 36 to the hinge pin 32 are secured in place to maintain a robust structural engagement between the cabinet mount 28 and the bushing 60 and also between the hinge pin 32 and the sheet metal flange 36. This robust engagement is used, in part, to prevent sagging of the door 12 over time as the door 12 is repeatedly operated between the open and closed positions 16, 18.

As exemplified in FIGS. 3-22, the cabinet mount 28 includes the bracket portion 64 having at least two brackets 90. Each bracket 90 of the bracket portion 64 includes a dedicated borehole 62 that receives a dedicated bushing 60 that is secured within each bracket 90 of the bracket portion 64. In addition, the hinge pin 32 can be in the form of separate hinge pins 32 that are inserted through each bushing 60 of the plurality of brackets 90. It is also contemplated that a single elongated hinge pin 32 can extend through all of the bushings 60 that are contained within the bracket portion 64 of the cabinet mount 28.

Referring again to FIGS. 3-22, the sheet metal flange 36 includes opposing attachment members 80 that correspond to each bushing 60 and each bracket 90. These opposing attachment members 80 are configured to be the outermost members of each bracket assembly 100 for the hinge 26. Typically, a bracket assembly 100 can include a bracket 90 of the bracket portion 64, a bushing 60 and a hinge pin 32, as well as other dedicated components. Accordingly, the hinge pin 32, the bushing 60, the washer 70 and the bracket 90 are confined between the opposing attachment members 80 of the sheet metal flange 36 to form a bracket assembly 100.

To assist in the press fit operation, each hinge pin 32 can include a textured portion 102 that receives at least one attachment member 80 of the opposing attachment members 80 for the sheet metal flange 36. This textured portion 102 defines an increased structural engagement between the hinge pin 32 and the sheet metal flange 36 to increase the structural integrity of this connection. This textured portion 102 can include knurling, etching, scoring, protuberances, corners, surface patterns and other texturing features that can be used to enhance the attachment between the hinge pin 32 and the attachment members 80 of the sheet metal flange 36.

Referring now to FIGS. 3-12, an aspect of the sheet metal hinge 10 includes a hinge pin 32 having a cam portion in the form of an abutment flange 110 that engages the integral stop 30 in the open position 16 of the door 12. The central bore 66 of the bushing 60 includes an enlarged section 112 that accommodates the abutment flange 110 of the hinge pin 32, wherein the abutment flange 110 is typically in the form of an elongated flange that extends along the hinge pin 32. This enlarged section 112 includes a radial surface 114 that defines the stop 30. Accordingly, when the sheet metal flange 36 and the hinge pin 32 are operated from the closed position 18 to the open position 16, the abutment flange 110 of the hinge pin 32 moves through the enlarged section 112 of the central bore 66 for the bushing 60 and engages the radial surface 114 of the central bore 66 to define the open position 16 of the door 12.

As exemplified in FIGS. 3-22, to prevent rotation of the bushing 60 relative to the cabinet mount 28, the end flange 68 of the bushing 60 includes a notch 116 that engages a locating tab 118 that is defined within each bracket 90 of the bracket portion 64 for the cabinet mount 28. The engagement between the notch 116 of the end flange 68 and the locating tab 118 of the bracket 90 at least partially secures the bushing 60 to the cabinet mount 28. The engagement between the bushing 60 and the cabinet mount 28 can be enhanced through various adhesives, welding, press fit operations, friction-type engagements, and other similar engagements that can be used to increase the strength of the connection between the bushing 60 and the bracket 90 for the bracket portion 64.

Referring now to FIGS. 7-12, the abutment flange 110 of the hinge pin 32 moves through the enlarged section 112 of the central bore 66 as the door 12 moves between the open and closed positions 16, 18. As discussed previously, the radial surface 114 of the enlarged section 112 defines the open position 16 of the door 12. The closed position 18 of the door 12 is typically defined by engagement between the door 12 and the front aperture 20 of the outer cabinet 14. In this manner, when the door 12 engages the front aperture 20, the abutment flange 110 is positioned within an intermediate portion 130 of the enlarged section 112 for the central bore 66. Accordingly, engagement between the abutment flange 110 of the hinge pin 32 and the bushing 60 can allow for a complete closure of the door 12 relative to the front aperture 20. The enlarged section 112 of the central bore 66 of the bushing 60 can include friction-reducing features such as smoothed surfaces, lubricants, and other similar low-friction features.

The central bore 66 of the bushing 60 includes a guide section 140 that engages the cylindrical outer surface 142 of the hinge pin 32 and guides operation of the hinge pin 32 about the rotational axis 34. The enlarged section 112 accommodates rotation of the abutment flange 110 about the rotational axis 34. The guide section 140 and the enlarged section 112 are configured to be concentric about the rotational axis 34 of the hinge pin 32. In addition, the guide section 140 and the enlarged section 112 of the central bore 66 for the bushing 60 are configured to typically extend entirely through the length of the bushing 60. In certain aspects of the device, the guide section 140 can extend entirely through the length of the bushing 60 and the enlarged section 112 can extend from one end of the bushing 60 and through a majority of the length of the bushing 60. Such configuration can be used to provide a single point of entry for the hinge pin 32 relative to the bushing 60. This configuration can be used to assist in securing the axial alignment of the hinge pin 32 and the bushing 60 relative to the rotational axis 34.

Referring again to FIGS. 7-12, the cylindrical outer surface 142 of the hinge pin 32 is configured to engage the guide section 140 of the central bore 66. In addition, to prevent wobbling or other displacement of the hinge pin 32 relative to the central bore 66, the abutment flange 110 is configured to engage an interior surface 150 of the enlarged section 112 so that an outermost surface 152 of the abutment flange 110 slides along the interior surface 150 of the enlarged section 112 of the central bore 66. This provides multiple points of contact along the length of the bushing 60 and between the hinge pin 32 and the bushing 60. To increase the stability of the hinge pin 32 within the central bore 66, the abutment flange 110 can include opposing abutment walls 154 that extend radially outward from the rotational axis 34 of the hinge pin 32. This configuration provides the abutment flange 110 with a robust structure for maintaining the stability of the hinge pin 32 within the central bore 66. This limits wobbling or other displacement of the rotational axis 34 during operation of the door 12 between the open and closed positions 16, 18. It is also contemplated that the guide section 140 of the central bore 66 can define more than 180 degrees of the central bore 66. Through this configuration, the guide section 140 encircles more than half of the cylindrical outer surface 142 of the hinge pin 32 to maintain the lateral alignment of the hinge pin 32 to be along the rotational axis 34. This configuration ensures that only the abutment flange 110 is permitted to be within the enlarged section 112 of the central bore 66.

Referring now to FIGS. 13-22, the hinge pin 32 can include a cam member 170 that includes a spacer portion 172 and an abutment portion 174 that selectively engages the blocking member 176 to define the integral stop 30. The blocking member 176 is formed within the bracket portion 64 of the cabinet mount 28. In this configuration, rotation of the door 12 to the open position 16 allows the cam member 170 of the hinge pin 32 to engage the blocking member 176 of the cabinet mount 28 to define the open position 16 of the door 12. As discussed herein, the bushing 60 that is positioned within each bracket 90 of the bracket portion 64 includes an end flange 68 having a notch 116. This notch 116 engages a locating tab 118 of each respective bracket 90 of the bracket portion 64 to secure the bushing 60 within the corresponding bracket 90. At an opposing side of the bracket 90 relative to the end flange 68 for the bushing 60, the cam member 170 is secured to the hinge pin 32. In this configuration, the spacer portion 172 of the cam member 170 provides the function of a washer 70 to limit axial motion of the hinge pin 32, the bushing 60 and the sheet metal flange 36 along the rotational axis 34. The abutment portion 174 of the cam member 170 extends eccentrically outward from the spacer portion 172 to engage the blocking member 176 in the open position 16 of the door 12. The cam member 170 can be secured to the hinge pin 32 via any one of various mechanisms and methods that can include, but are not limited to, adhesives, welding, press fit, molding, and other similar operations. It is also contemplated that the cam member 170 can be integrally formed with the hinge pin 32 during manufacture of the hinge pin 32.

Referring again to FIGS. 13-22, the central bore 66 of the bushing 60 includes a central bore 66 having a consistent diameter to accommodate rotation of the hinge pin 32 therethrough. One side of the bracket 90 receives the end flange 68 for the bushing 60 that spaces one of the opposing attachment members 80 apart from the bracket 90 and provides for rotational operation of the sheet metal flange 36 relative to the bracket 90. At the opposing side of the bracket 90 relative to the end flange 68 for the bushing 60, the cam member 170 is positioned to provide a spacing function between the bracket 90 and the other attachment member 80 of the opposing attachment members 80 for the sheet metal flange 36. As discussed herein, the bushing 60 is fixedly secured to the bracket 90. The hinge pin 32, along with the cam member 170, is fixedly secured to the sheet metal flange 36. Through these secure engagements, rotational operation of the door 12 between the open and closed positions 16, 18 can be accomplished through a robust connection between the cabinet mount 28, the bushing 60, the hinge pin 32 and the sheet metal flange 36.

As exemplified in FIGS. 13-22, the integral stop 30 can be formed as a portion of the cabinet mount 28. Typically, the cabinet mount 28 is made from cast metal and the blocking member 176 is formed through this metal casting process. The blocking member 176 is generally spaced apart from the bushing 60 to allow for rotational operation of the spacer portion 172 of the cam member 170 about the rotational axis 34. When the door 12 approaches the open position 16, the abutment portion 174 of the cam member 170 comes into engagement with the blocking member 176 to prevent further rotation of the door 12 beyond the open position 16. The abutment portion 174 of the cam member 170 can take various shapes and configurations. Typically, the abutment portion 174 extends eccentrically outward from the spacer portion 172 of the cam member 170. This configuration provides for free rotation of the hinge pin 32 and the sheet metal flange 36 from the closed position 18 and toward the open position 16, and various positions therebetween. The positioning of the abutment portion 174 is configured to only engage the blocking member 176 when the door 12 reaches the open position 16.

Referring now to FIGS. 1-12 and 23, having described various aspects of the device, a method 400 is disclosed for attaching a door 12 to an appliance cabinet 14. According to the method 400, step 402 includes placing a bushing 60 within a bracket portion 64 of a cabinet mount 28 for a hinge 26. As discussed herein, each cabinet mount 28 can include a plurality of brackets 90 within the bracket portion 64. As exemplified in the figures, the bracket portion 64 includes two brackets 90. It is contemplated that the bracket portion 64 can include a single bracket 90 or can include more than two brackets 90 for the bracket portion 64. According to the method 400, a hinge pin 32 is inserted within a central bore 66 of a bushing 60 (step 404). When inserting the hinge pin 32 within the central bore 66, opposing ends 82 of the hinge pin 32 extend outward from each bracket 90 of the bracket portion 64, as well as the bushing 60. A cam portion of the hinge pin 32, which can be in the form of an abutment flange 110 that extends from the hinge pin 32, is located to abut a stop 30 that defines an open position 16 of the hinge 26 (step 406). Locating the abutment flange 110 of the hinge pin 32 involves placing the abutment flange 110 within an enlarged section 112 of the central bore 66 for the bushing 60. In this manner, engagement of the abutment flange 110 with the integral stop 30 of the enlarged section 112 of the bushing 60 defines the open position 16 of the hinge 26.

Referring again to FIGS. 1-12 and 23, according to the method 400, attachment members 80 of the sheet metal flange 36 are located proximate the opposing ends 82 of the hinge pin 32 (step 408). When locating the attachment members 80 of the sheet metal flange 36, the attachment members 80, in an elongated state 188, are aligned to position the bushing 60, the bracket 90 and a washer 70 between interior edges 190 of the opposing attachment members 80 of the sheet metal flange 36. When the attachment members 80 of the sheet metal flange 36 are located, the attachment members 80 are press fit around the opposing ends 82 of the hinge pin 32 to define a secured state 192 of the attachment members 80 (step 410). This press fitting operation fixedly secures the sheet metal flange 36 to the hinge pin 32. The press fit operation also prevents axial motion of the bushing 60 to fixedly secure the bushing 60 to the cabinet mount 28. In this manner, the sheet metal flange 36 and the hinge pin 32 are attached together and rotate relative to the bushing 60 and the cabinet mount 28, which are also attached together. As discussed herein, the abutment flange 110 of the hinge pin 32 operates within the enlarged section 112 of the central bore 66 and engages a radial surface 114 of the enlarged section 112 that define the integral stop 30 as well as the open position 16 of the door 12.

According to the method 400, after the press fitting of the attachment members 80 around the opposing ends 82 of the hinge pin 32 is complete, the cabinet mount 28 of the hinge 26 is attached to the appliance cabinet 14 (step 412). In addition, the sheet metal flange 36 is attached to the door 12 (step 414). In attaching the sheet metal flange 36 of the hinge 26 to the door 12 and the cabinet mount 28 to the appliance cabinet 14, screws, bolts or other fasteners 38 are typically used. According to various aspects of the device, various covers or other concealing members can be used for hiding the presence of the fasteners 38 that attach the various components of the hinge 26 to the door 12 and the appliance cabinet 14.

Referring now to FIGS. 1-2, 13-22 and 24, having described various aspects of the device, a method 500 is disclosed for attaching a door 12 to an appliance cabinet 14. According to the method 500, a step 502 includes placing a bushing 60 within a bracket portion 64 of a cabinet mount 28 for a hinge 26. As discussed above, each bracket 90 of the bracket portion 64 typically includes a dedicated bushing 60 that is secured within the borehole 62 for each bracket 90 of the bracket portion 64. After the bushing 60 is placed, the hinge pin 32 is inserted within the central bore 66 of the bushing 60 (step 504). In inserting the hinge pin 32, opposing ends 82 of the hinge pin 32 extend outward from the bracket portion 64 and the bushing 60. In addition, the hinge pin 32 includes a cam member 170 that is fixedly attached to the hinge pin 32 and rotates with the hinge pin 32. After inserting the hinge pin 32, an abutment portion 174 of the cam member 170 is located to selectively engage a stop 30 of the bracket portion 64 to define the open position 16 of the hinge 26 (step 506).

In locating the abutment portion 174 of the cam member 170, the spacer portion 172 of the cam member 170 is positioned to one side of the bracket 90 and the end flange 68 of the bushing 60 is positioned at the opposing side of the bracket 90. In this manner, the spacer portion 172 of the cam member 170 and the end flange 68 of the bushing 60 space apart the various components of the hinge 26 to prevent direct engagement of the sheet metal flange 36 with the cabinet mount 28.

Referring again to FIGS. 13-22 and 24, according to the method 500, a step 508 includes locating attachment members 80 of the sheet metal flange 36 on or proximate the opposing ends 82 of the hinge pin 32. In locating the attachment members 80 of the sheet metal flange 36, the cam member 170 is located between the bracket portion 64 and one of the attachment members 80 of the sheet metal flange 36. In this manner, the cam member 170 also serves as the washer 70 for the hinge assembly that separates the sheet metal flange 36 from the cabinet mount 28. After the attachment members 80 of the sheet metal flange 36, in the elongated state 188, are located proximate the ends of the hinge pin 32, the attachment members 80 are press fit onto the opposing ends 82 of the hinge pin 32 to fixedly secure the sheet metal flange 36 to the hinge pin 32 and also fixedly secure the bushing 60 to the cabinet mount 28 (step 510). As discussed herein, the press fit operation defines the secured state 192 of the attachment members 80 of the sheet metal flange 36.

After the press fitting of the attachment members 80 onto the opposing ends 82 of the hinge pin 32 is complete, the cabinet mount 28 of the hinge 26 is attached to the appliance cabinet 14 (step 512). The sheet metal flange 36 is also attached to the door 12 (step 514). Again, these attachments are typically accomplished through various fasteners 38.

According to various aspects of the device, as exemplified in FIGS. 1-24, the press fitting operation that secures the attachment members 80 of the sheet metal flange 36 to the opposing ends 82 of the hinge pin 32 is accomplished through a mechanism that bends or wraps the attachment members 80 from the elongated state 188 that is characterized by a generally linear position to the press fit hinge position that secures the attachment members 80 to the hinge pin 32 in the secured state 192. This press fit operation occurs after the hinge pin 32, the bushing 60 and the cam member 170 or washer 70 are located relative to one another. The press fit operation serves to secure these portions of the device together to provide a robust rotational engagement that forms the hinge 26 for operating the door 12 between the open and closed position 16, 18.

Typically, the door 12 will be used for a horizontal axis washing machine where the door 12 rotates about the rotational axis 34 that is either vertical or near vertical. Accordingly, when the door 12 is away from the closed position 18, certain moment forces are exerted upon the hinge 26 as the door 12 hangs from the hinge 26 in the open position 16 or one of the intermediate positions that is away from the closed position 18. The robust configuration of the hinge 26, as described herein, accommodates these moment forces to prevent sagging or other downward deflection of the door 12 over time. In addition, when the door 12 is moved to the open position 16 and certain abuse loads are placed upon the door 12, these abuse loads are placed directly upon the hinge pin 32 and the integral stop 30 that is formed between the hinge pin 32 and the cabinet mount 28. Accordingly, these abuse forces are generally directed through more robust components of the hinge 26.

In forming the sheet metal flange 36, the sheet metal flange 36 is typically stamped, cut or otherwise formed out of a sheet of sheet metal and then formed into the desired configuration through an additional stamping process or other similar forming processes that produce the various undulations and support flanges that are formed within the sheet metal flange 36. Using this forming operation, the sheet metal flange 36 can be formed through the use of minimal materials as well as a minimal amount of time and resources.

According to various aspects of the device, the configuration of the sheet metal flange 36 and the cabinet mount 28 are similar in each configuration of the sheet metal hinge 10 described herein. The engagement between the hinge pin 32, the bushing 60 and the washer 70 can vary between the various aspects of the device. In this manner, the integral stop 30 that is formed between the sheet metal flange 36 and the cabinet mount 28 can be defined by the configuration of the hinge pin 32, the bushing 60 and the washer 70 that are used to separate the sheet metal hinge 10 and the cabinet mount 28 from one another. In addition, the hinge pin 32, the bushing 60 and the washer 70 also serve to align the sheet metal hinge 10 and the cabinet mount 28 with one another to provide for rotation of the door 12 around the rotational axis 34 of the hinge pin 32. This configuration of the sheet metal hinge 10 provides robust engagement between the door 12 and the outer cabinet 14 that is able to significantly resist conventional loads as well as certain abuse loads that are placed on the door 12 over the life of the appliance. In addition, the use of the sheet metal flange 36 in combination with the integral stop 30, provides for a more efficient use of time and resources in manufacturing the sheet metal hinge 10 and the appliance in general.

According to another aspect of the present disclosure, an appliance includes an outer cabinet having a front aperture for accessing a processing space. A door selectively engages the front aperture in a closed position to enclose the processing space. A hinge includes a cabinet mount attached to the outer cabinet and having a stop that defines an open position of the door. A hinge pin extends through the cabinet mount to define a rotational axis of the hinge. A sheet metal flange is press fit onto the hinge pin and is fixedly attached to the door. The sheet metal flange is wrapped around the hinge pin and is attached to the door via fasteners. The pin includes a protrusion that selectively engages the stop of the cabinet mount in the open position.

According to another aspect, the cabinet mount includes a bushing that is secured within a bracket portion of the cabinet mount. The hinge pin extends through a central bore of the bushing and is rotationally operable within the bushing between the open and closed positions.

According to yet another aspect, the bushing includes an end flange positioned at one side of the bracket portion. A washer is positioned at an opposing side of the bracket portion.

According to another aspect of the present disclosure, the hinge pin includes an abutment flange that engages the stop in the open position of the door. The central bore of the bushing includes a an enlarged section that accommodates the abutment flange. The enlarged section includes a radial surface that defines the stop.

According to another aspect, the hinge pin includes a cam member and the stop is formed within the bracket portion of the cabinet mount. Rotation of the door to the open position engages the cam member of the pin with the stop of the cabinet mount.

According to yet another aspect, the cam member includes a spacer portion and an abutment portion that selectively engages the stop.

According to another aspect of the present disclosure, the bushing includes an end flange that includes a notch. The notch engages a locating tab of the bracket portion of the cabinet mount that at least partially attaches the bushing to the cabinet mount.

According to another aspect, the sheet metal flange includes opposing attachment members that are press fit onto opposing ends of the hinge pin.

According to yet another aspect, the opposing attachment members of the sheet metal flange are configured to be press fit onto the opposing ends of the hinge pin when the pin is positioned within the bushing and the bracket portion.

According to another aspect of the present disclosure, the cabinet mount is made of cast metal.

According to another aspect, a method for attaching a door to an appliance cabinet includes steps of placing a bushing within a bracket portion of a cabinet mount for a hinge, and inserting a hinge pin within a central bore of the bushing. Opposing ends of the hinge pin extend outward from the bracket portion and the bushing. A cam portion of the hinge pin is located to abut a stop to define an open position of the hinge. The stop is located within the central bore of the bushing. Attachment members of a sheet metal flange are located on the opposing ends of the hinge pin. The attachment members are press fit around the opposing ends of the hinge pin to fixedly secure the sheet metal flange to the hinge pin and fixedly secure the busing to the cabinet mount.

According to yet another aspect, the step of placing the bushing within the bracket portion includes locating a notch that is defined within an end flange of the bushing to engage a locating tab of the bracket portion.

According to another aspect of the present disclosure, the cabinet mount of the hinge is attached to said appliance cabinet. The sheet metal flange of the hinge is attached to said door.

According to another aspect, the cam portion of the hinge pin is located within an enlarged section of the central bore for the bushing. Engagement of an abutment flange with the stop of the enlarged section defines the open position of the hinge.

According to yet another aspect, the cam portion of the hinge pin is an elongated flange and the enlarged section extends through at least a majority of the bushing to receive the elongated flange.

According to another aspect of the present disclosure, a method for attaching a door to an appliance cabinet includes placing a bushing within a bracket portion of a cabinet mount for a hinge. A hinge pin is inserted within a central bore of the bushing. Opposing ends of the hinge pin extend outward from the bracket portion and the bushing. The hinge pin includes a cam member. An abutment portion of the cam member selectively engages a stop of the bracket portion in an open position of the hinge. Attachment members of a sheet metal flange are located on the opposing ends of the hinge pin. The cam member is located between the bracket portion and one of the attachment members. The attachment members are press fit onto the opposing ends of the hinge pin to fixedly secure the sheet metal flange to the hinge pin and fixedly secure the bushing to the cabinet mount.

According to another aspect, the cam member includes a spacer portion that is fixedly attached to an outer surface of the hinge pin.

According to yet another aspect, the abutment portion extends radially outward from the spacer portion.

According to another aspect of the present disclosure, the step of placing the bushing within the bracket portion includes locating a notch that is defined within an end flange of the bushing to engage a locating tab of the bracket portion. The end flange opposes the spacer portion of the cam member.

According to another aspect, the cabinet mount of the hinge is attached to said appliance cabinet. The sheet metal flange of the hinge is attached to said door.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An appliance comprising:

an outer cabinet having a front aperture for accessing a processing space;

a door that selectively engages the front aperture in a closed position to enclose the processing space; and a hinge comprising:

a cabinet mount attached to the outer cabinet and having a stop that defines an open position of the door;

a hinge pin that extends through the cabinet mount to define a rotational axis of the hinge;

a sheet metal flange that is press fit onto the hinge pin and is fixedly attached to the door, wherein the sheet metal flange is wrapped around the hinge pin and is attached to the door via fasteners, and wherein the hinge pin includes a protrusion that selectively engages the stop of the cabinet mount in the open position, wherein the cabinet mount includes a bushing that is secured within a bracket portion of the cabinet mount, the hinge pin extending through a central bore of the bushing and being rotationally operable within the bushing between the open and closed positions;

the sheet metal flange includes opposing attachment members that are press fit onto opposing ends of the hinge pin and configured to be press fit onto the opposing ends of the hinge pin when the hinge pin is positioned within the bushing and the bracket portion.

2. The appliance of claim 1, wherein the bushing includes an end flange positioned at one side of the bracket portion, and wherein a washer is positioned at an opposing side of the bracket portion.

3. The appliance of claim 1, wherein the hinge pin includes an abutment flange that engages the stop in the open position of the door, and wherein the central bore of the bushing includes an enlarged section that accommodates the abutment flange, the enlarged section having a radial surface that defines the stop.

4. The appliance of claim 3, wherein the abutment flange is at least partially contained within the central bore of the bushing.

5. The appliance of claim 3, wherein the abutment flange includes an abutment wall that engages the radial surface of the central bore to define the open position of the door.

6. The appliance of claim 3, wherein the central bore of the bushing includes the enlarged section through which the abutment flange operates, and wherein the central bore includes a guide section that engages a cylindrical outer surface of the hinge pin to guide operation of the hinge pin about the rotational axis.

7. The appliance of claim 6, wherein the enlarged section and the guide section extend along an entire length of the bushing.

8. The appliance of claim 6, wherein the enlarged section of the bushing extends to only one end of the bushing to define a single end of entry for the hinge pin having the abutment flange.

9. The appliance of claim 3, wherein the abutment flange of the hinge pin engages an interior surface of the enlarged section of the central bore.

10. The appliance of claim 1, wherein the hinge pin includes a cam member and the stop is formed within the bracket portion of the cabinet mount, wherein rotation of the door to the open position engages the cam member of the hinge pin with the stop of the cabinet mount.

11. The appliance of claim 10, wherein the cam member includes a spacer portion and an abutment portion that selectively engages the stop.

12. The appliance of claim 10, wherein the cam member is a separate member that is attached to the hinge pin.

13. The appliance of claim 10, wherein the cam member is at least partially secured to the hinge pin via the opposing attachment members.

14. The appliance of claim 10, wherein the stop is a blocking member that is spaced apart from the bushing, and wherein the blocking member is integrally formed with the cabinet mount.

15. The appliance of claim 1, wherein the bushing includes an end flange that includes a notch, wherein the notch engages a locating tab of the bracket portion of the cabinet mount that at least partially attaches the bushing to the cabinet mount.

16. The appliance of claim 1, wherein the cabinet mount is made of cast metal.

17. The appliance of claim 1, wherein at least one end of the opposing ends of the hinge pin includes a textured portion that receives at least one of the opposing attachment members.

18. The appliance of claim 1, wherein the sheet metal flange and the hinge pin are fixedly attached to one another and rotate about the rotational axis as a single unit.

19. The appliance of claim 1, wherein the bushing is fixedly attached to the cabinet mount.

20. The appliance of claim 1, wherein the bracket portion includes a plurality of brackets that receive separate portions of the hinge pin.

* * * * *